Dec. 19, 1950 — L. C. BARLING — 2,534,942
OUTLET VALVE HELD OPEN BY FLOW
Filed July 30, 1947
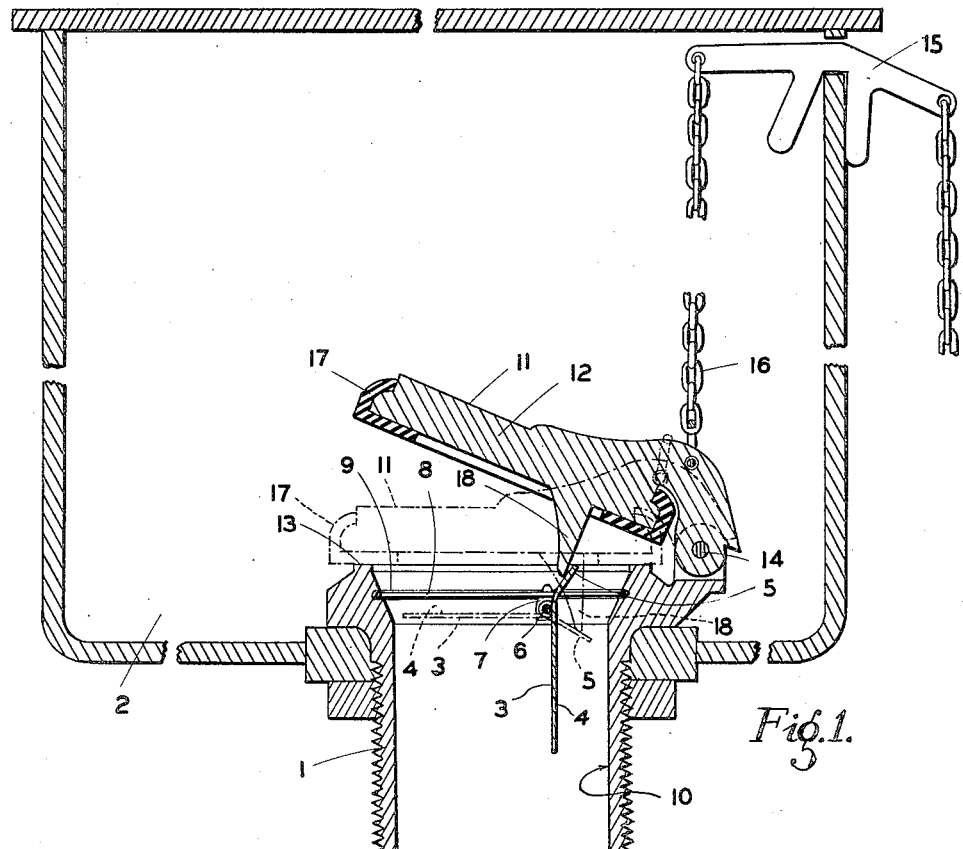
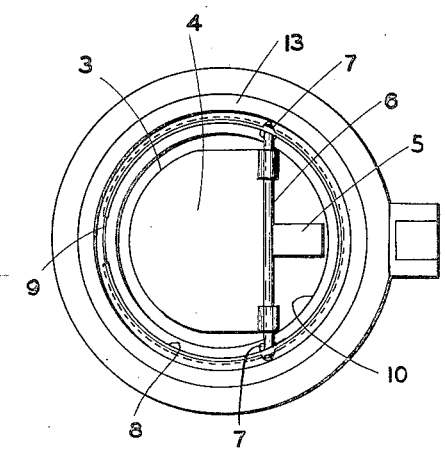
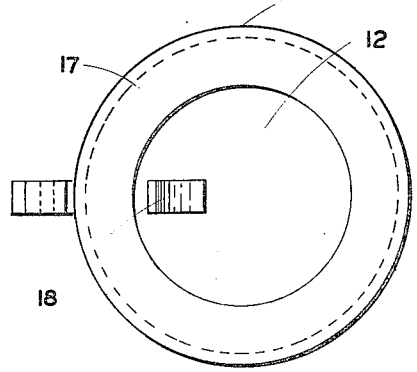
INVENTOR:
LESLIE CLEMENT BARLING Patented Dec. 19, 1950

2,534,942

UNITED STATES PATENT OFFICE 2,534,942

OUTLET VALVE HELD OPEN BY FLOW

Leslie Clement Barling, Johannesburg, Transvaal, Union of South Africa

Application July 30, 1947, Serial No. 764,855
In Great Britain April 1, 1947

9 Claims. (Cl. 4—65)

This invention relates to valves and has particular reference to flushing valves suitable for use, for example, in domestic water closet cisterns. As is well known, such valves are opened either automatically or by manual operation of a trigger and are arranged to close automatically after a predetermined quantity of water has been discharged from the cistern.

The object of the present invention is to provide a valve of the above-mentioned type which shall be cheap and easy to manufacture and reliable in use.

According to the invention, a flushing valve of the type described comprises a butterfly member pivotally mounted within an outlet from a cistern and arranged, when free to move about its pivot under the action of gravity alone, to lie in a materially vertical plane; a projection associated with said butterfly member; a pivotally mounted flap member disposed above said butterfly member and adapted to be raised from and lowered onto a seating formed on said outlet; and a depending lug on the underside of said flap member adapted to engage with the projection on the butterfly member so as to maintain the latter in a materially horizontal plane when the flap member rests on its seating.

The flap member is arranged to be raised from its seating by known means (e. g. either automatically or by manual operation of the conventional type of push-button or other actuating lever) and to re-seat itself automatically under the action of gravity after flushing has taken place.

Preferably, the projection is in the form of an arm and lies in a plane inclined at an obtuse angle to that of the butterfly member. It is preferable, moreover, to mount the butterfly member on a horizontal pivot which is displaced laterally from the centre of the outlet from the cistern, and to retain it in place by means of a split ring disposed within an annular groove in the internal periphery of the outlet.

A resilient gasket is provided on the flap member to improve the liquid seal and the weight of the flap member is greater than that of the butterfly member.

The invention will be further described with reference to the accompanying drawings in which:

Fig. 1 is a sectional elevation of a valve according to the invention installed in a domestic water closet cistern. The full lines indicate the open position of the valve whilst the closed position is shown by dotted lines.

Fig. 2 is an inverted plan view of the flap member.

Fig. 3 is a plan view of the valve of Fig. 1 with the flap member removed and with the butterfly member in the horizontal position.

Referring to the drawings, flushing of the closet is effected in the normal manner through a tail piece 1 of circular cross-section screwed into the base of a cistern 2. A butterfly member 3, which comprises a plate 4, is associated with a projecting arm 5, and is secured to a pivot 6 the extremities of which are inserted into sockets 7 in the internal periphery of the upper portion of the tailpiece 1. Said butterfly member 3 is held in place by means of a brass retaining circlet 8 inserted into an annular groove 9.

As will be seen from the drawings, the pivotal axis of the butterfly member 3 is offset from the centre of the tailpiece 1. Moreover, the weight of the plate 4 is greater than that of the arm 5 with the result that, unless it is restrained, the butterfly member 3 will tend to lie in a materially vertical plane within the tailpiece 1. By reason of the fact that the butterfly member is eccentrically mounted within the tailpiece 1, the internal periphery 10 of said tail piece acts as a stop and it is impossible to force the plate 4 into a position over the vertical.

A flap member 11 comprises a metal disc 12 arranged to lie when closed on a seating 13 formed on the top of the tailpiece 1. Said flap member 11 is pivotally mounted at 14 on the tailpiece 1 and its pivotal axis is preferably parallel to that of the butterfly member 3. The flap member 11 is capable of movement in the vertical plane and is arranged to be raised from its seating 13 by manual operation of an actuating lever 15 through the intermediary of a conventional link system 16. The flap member 11 is provided with a resilient gasket 17 to improve the liquid seal and is formed on its underside with a depending tongue or lug 18 in the same vertical plane as that of the arm 5 and adapted for engagement with the latter. The weight of the flap member 11 is greater than that of the butterfly member 3.

In the closed position of the valve, the flap member 11 rests on its seating 13. The lug 18 bears down upon the arm 5 thus causing the plate 4 of the butterfly member 3 to be maintained in a materially horizontal plane.

When the flap member 11 is raised about its pivot 14 by manual operation of the actuating lever 15, the plate 4 tends to drop, by reason of the disposition of the centre of gravity of the butterfly member 3, from the horizontal into the vertical position. At the same time, water in the cistern 2 is permitted to pass into the tailpiece 1 and the pressure of the head of water on the plate 4 holds the butterfly member in the vertical position which it has tended to assume. The arm 5 now extends upwards and, since it is in engagement with the depending lug 18 on the underside of the flap member 11, the latter is prevented from closing by reason of the fact that the force exerted by the head of water acting on the plate 4 overcomes the tendency of the flap member 11 to close under gravity.

After flushing, there is an insufficient head of water in the cistern 2 to pivot the butterfly member 3 against the weight of the flap member 11 and the latter will then close automatically under the action of gravity.

I claim:

1. A valve of the type described comprising a butterfly member pivotally mounted within an outlet from a cistern and arranged, when free to move about its pivot under the action of gravity alone, to lie in a materially vertical plane; a projection associated with said butterfly member; a pivotally mounted flap member disposed above said butterfly member and adapted to be raised from and lowered onto a seating formed on said outlet; and a depending lug on the underside of said flap member adapted to engage with the projection on the butterfly member so as to maintain the latter in a materially horizontal plane when the flap member rests on its seating.

2. A valve according to claim 1, in which the projection lies in a plane inclined at an obtuse angle to that of the butterfly member.

3. A valve according to claim 1, in which the flap member is arranged to be raised from its seating by known means and to re-seat itself automatically under the action of gravity after flushing has taken place.

4. A valve according to claim 1, in which the butterfly member is mounted on a horizontal pivot displaced laterally from the centre of the outlet from the cistern.

5. A valve according to claim 1, in which the flap member is provided with a resilient gasket.

6. A valve according to claim 1, in which the butterfly member is retained in its mounting by means of a retaining circlet disposed within an annular groove in the internal periphery of the outlet from the cistern.

7. A valve according to claim 1, in which the weight of the flap member is greater than that of the butterfly member.

8. A valve according to claim 1, in which the butterfly member is restrained from taking up a position over the vertical.

9. A valve according to claim 1, in which the butterfly member is eccentrically mounted and in its horizontal position covers the greater part of the cross-section of the outlet.

LESLIE C. BARLING.

REFERENCES CITED

The following references are of record in the file of this patent:

UNITED STATES PATENTS

| Number | Name | Date |
|---|---|---|
| 1,178,306 | Field | Apr. 4, 1916 |
| 1,618,268 | Christie | Feb. 22, 1927 |
| 2,175,973 | Reed | Oct. 10, 1939 |

FOREIGN PATENTS

| Number | Country | Date |
|---|---|---|
| 22,410/35 | Australia | Jan. 9, 1936 |